Patented June 21, 1949

2,473,996

UNITED STATES PATENT OFFICE 2,473,996

POLYMERS FROM ETHYLENE AND BRANCHED CHAIN VINYL ESTERS

William E. Hanford, Easton, Pa., and John R. Roland and Walter E. Mochel, Wilmington, Del., assignors to E. I. du Pont de Nemours & Company, Wilmington, Del., a corporation of Delaware No Drawing. Application July 6, 1944, Serial No. 543,732

9 Claims. (Cl. 260—87.3)

This invention relates to new polymeric products, and more particularly to new polymers of ethylene.

It is an object of this invention to provide polymers of ethylene with vinyl esters of monocarboxylic acids in which the carboxyl group is linked either directly or through an intervening methylene group to a carbon atom which has at least two of its remaining valences attached to carbon atoms. It is another object of this invention to provide polymers of ethylene with vinyl esters of short chain aliphatic monocarboxylic acid in which the carbon atom of the carboxyl group is linked either directly or through a methylene group to a carbon which has at least two of its remaining valences attached to carbon atoms. A still further object is to provide polymers of ethylene with vinyl esters of short chain alkyl substituted aliphatic monocarboxylic acids of the above type. A final object is to provide polymers of ethylene with vinyl esters of di- and trialkyl substituted acetic acids.

The above and other objects appearing hereinafter are attained by heating ethylene and the vinyl ester in the presence of a catalyst.

In practicing the invention as a batch operation, a suitable pressure vessel is charged with the vinyl ester, and if desired, a nonpolymerizable, normally liquid, volatile, reaction medium and a peroxy compound catalyst. The vessel is then closed, evacuated, placed in an agitating rack, and ethylene is added to such a pressure as will (after heating to reaction temperature) give a pressure in the desired range. It is then heated, with agitation, to the desired temperature and maintained at that temperature until there is no further pressure drop. The pressure in the system is maintained either by periodically repressuring with ethylene, by injecting solvent or vinyl ester, or ethylene and vinyl ester. After reaction is complete, the vessel is allowed to cool to room temperature, excess ethylene is bled off, the vessel is opened, and the polymer recovered by filtration or by other means known to the art.

The process of this invention is generally practiced at temperatures in the range of 40° to 350° C. and generally at about 50° to 200° C. and at pressures above atmospheric. In general the pressure selected depends upon the composition of polymer desired. Thus, employing ethylene pressures ranging from atmospheric to 100 atmospheres, polymers containing from 0.5 to 5 mole percent of ethylene are obtained while for polymers richer in ethylene, pressures of ethylene of 200 or more atmospheres and preferably in the range of 800 to 1500 atmospheres are employed.

As a rule the use of high pressures permits the use of lower temperatures. The particular conditions of temperatures and pressure used in any one case are determined by the vinyl organic ester polymerized with the ethylene, by the catalyst used, and as previously indicated by the nature of the products desired.

In the practice of this invention it is necessary to use relatively small amounts of peroxy compounds as catalysts. By "peroxy compound" is meant any compound which contains the bivalent group —O—O—. Examples of such compounds are succinic peroxide, butyryl peroxide, hydrogen peroxide, acetyl peroxide, acetyl benzoyl peroxide, lauroyl peroxide, diethyl dioxide, tetralin peroxide, urea peroxide, tertiary butyl hydroperoxide, ketone peroxides, e. g., acetone triperoxide, hetero peroxides from acetone and methyl ethyl ketone, peracetic acid, alkali metal persulfates, perborates, and percarbonates, ammonium percarbonate, persulfate, perborates, and the like. There may also be employed combinations of the foregoing compounds as well as combinations of persulfates, such as sodium or potassium persulfate with selected buffering agents such as alkali metal phosphates, which may be produced by adding sodium hydroxide to phosphoric acid until a pH of about 9 is obtained. In addition to peroxy compounds, molecular oxygen or substances which yield free radicals on thermal decomposition such as tetraethyl lead may be used as catalysts.

The amount of catalyst used may range from about 0.001% to about 2.0%, based on the weight of monomers. Generally speaking an amount of the order of about 0.05% to 1.0% based on the combined weight of polymerizing monomers, is employed.

If desired, the catalyst can be added to the reaction mixture either in the form of an aqueous dispersion or emulsion or in solution in either a nonpolymerizable liquid organic solvent or in the vinyl ester.

The polymerization of ethylene with the vinyl esters of this invention is most suitably carried out in an aqueous medium. If desired, however, the medium may be omitted altogether or the menstruum may be a mixture of water and a normally liquid, nonpolymerizable, volatile organic substance. For this purpose it is preferable to use organic compounds which are free of secondary or tertiary hydrogens, particularly hydrogen in an activated position. Examples of such compounds are benzene, chlorobenzene, tertiary-butyl alcohol, toluene, methyl trimethylacetate, methyl tertiary-butyl ketone, methyl tertiary-butyl ether, dimethyl ether, pivaloin, ditertiary butyl ketone, etc. Other compounds which while possessing a secondary or tertiary hydrogen, are highly branched or have sterically hindered structures, may be used. Examples of such compounds are isooctane, pentamethylethane, methyl tertiary-butylacetate, methyl hexahydrobenzoate, methyl diethylacetate, etc.

In operating in an aqueous medium it is not necessary to use a dispersant but the addition of such substances may sometimes be desirable. If such substances are used, they are preferably selected from the class comprising starch, the water-soluble salts of the higher alkyl sulfates and alkanesulfonates, alkali metal salts of sulfonated mineral oils and such non-ionic water-soluble compounds as are produced by the condensation of several moles of ethylene oxide with long chain phenols, amines, alcohols, or acids.

The ethylene employed in the practice of this invention should be of good quality. It may, however, contain small quantities of methane, ethane, nitrogen, hydrogen, propane, acetylene, or oxygen. The amount of tolerable impurity depends upon its nature. In general the amount of oxygen and acetylene present in ethylene should not be more than 1,000 parts per million and preferably less than 50 parts per million.

The previously described general procedure illustrates batch operation of the process of the invention. The process may also be carried out, however, as a continuous or semi-continuous operation.

The examples which follow illustrate the process of this invention and demonstrate suitable conditions of operation in a 400 cc. capacity reactor. The quantities of reactants are given in parts by weight unless otherwise stated.

*Example 1.*—A silver-lined high pressure reaction vessel is charged with 20 parts of vinyl trimethylacetate, 80 parts of deaerated water, and 0.2 part of benzoyl peroxide. The pH of this mixture is adjusted from 5.5 to 3.7 by the addition of a few drops of formic acid. The vessel is closed, evacuated, placed in a shaker box and pressured with ethylene. During a reaction time of 10.75 hours, throughout which the temperature is maintained at 74° to 76° C. and the pressure at 850 to 985 atmospheres, the total observed pressure drop is 975 atmospheres. From the reaction mixture there is isolated 56 parts of a polymer which can be pressed readily to strong clear films which show good cold drawing aptitude and toughness. The polymer contains 63.2% carbon and 13.9% hydrogen, from which it may be calculated that the ethylene/vinyl ester mole ratio is 29/1 (3.3 mole per cent vinyl trimethylacetate). The intrinsic viscosity of the polymer is 2.1 (measured on a 0.125 solution in xylene at 85° C.). This polymer shows a draw ratio of 475, a tensile strength of 2,620 pounds/sq. in. and an elongation of 400%. Draw ratio is calculated by means of the equation which follows:

$$\text{Draw ratio} = \frac{\text{Draw length}}{\text{Original length}} \times 100$$

*Example 2.*—A stainless steel-lined reaction vessel is charged with 40 parts of vinyl tertiary-butylacetate, 60 parts of deaerated water, 0.2 part of benzoyl peroxide. The pH of this mixture is 4.6. The vessel is closed, evacuated, and pressured with ethylene. During a reaction time of 10.5 hours, during which the temperature is maintained at 73° to 76° C. and the pressure at 860 to 955 atmospheres, there is a total observed pressure drop of 385 atmospheres. From the reaction mixture there is obtained 28 parts of a polymer having an intrinsic viscosity of 1.05 (measured on a 0.125% solution in xylene at 85° C.). Analysis of the product shows it to contain 81.6% carbon and 13.4% hydrogen, from which it may be calculated that the polymer has an ethylene/vinyl ester mole ratio of 17.1/1 (5.5 mole per cent of vinyl tertiary-butylacetate). This polymer has a tensile strength of 3,290 lbs./sq. in. and an elongation of 750%.

*Example 3.*—A stainless steel-lined reaction vessel is charged with 100 parts of deaerated water, 10 parts of vinyl benzoate, 0.2 part of benzoyl peroxide. The pH of the mixture is 3.0. The vessel is closed, evacuated, and pressured with ethylene. During a reaction time of 17.25 hours, during which the temperature is maintained at 94° to 96° C. and the pressure at 830 to 950 atmospheres there is a total observed pressure drop of 270 atmospheres. The reaction mixture has a pH of 4.7. From this reaction mixture there is obtained 23 parts of a polymer which is readily pressed into strong clear film which can be cold drawn to 500% of their original length and which show good elasticity. Solvent-cast films have a draw ratio of 500, a tensile strength of 2220 lbs./sq. in. and an elongation of 605%. The intrinsic viscosity of this polymer is 0.71 (measured on a 0.125% solution in xylene at 85° C.), and the carbon content is 84.2%, from which it may be calculated that the mole ratio of ethylene/vinyl benzoate is 42/1 (2.3 mole per cent of vinyl benzoate).

*Example 4.*—A pressure vessel is charged with a mixture of 95 parts of deaerated water, 5 parts of vinyl diethylacetate, and 0.2 part of benzoyl peroxide. The pH of the mixture is adjusted to 3.1. The vessel is closed, evacuated, and pressured with ethylene. During a reaction period of 16.75 hours throughout which the temperature is maintained at 73° to 76° C. and the pressure at 850 to 970 atmospheres there is a total pressure drop of 670 atmospheres. This reaction mixture has a pH of 3.1. From the reaction mixture there is isolated 60 parts of a polymer which can be readily pressed into strong, tough films, and which has an intrinsic viscosity of 1.39 (measured on 0.125% solution in xylene at 85° C.). This polymer is found to have a tensile strength 2030 lbs./sq. in. and elongation of 217%. Proximate analysis shows the polymer to contain 84.6% carbon and 13% hydrogen from which it may be calculated that the polymer contains 1.3 mole per cent of vinyl diethylacetate.

*Example 5.*—A pressure vessel is charged with a mixture of 90 parts of deaerated water, 13 parts of vinyl 2,4-dimethylpentanoate and 0.2 part of benzoyl peroxide. The pH of the mixture is adjusted to 3.7. The vessel is closed, evacuated, and pressured with ethylene. During a reaction time of 16 hours, throughout which the temperature is maintained at 74° to 76° C. and the pressure at 830 to 970 atmospheres there is a total observed pressure drop of 1475 atmospheres. From the reaction mixture there is isolated 108 parts of a polymer analyzing 84.2% carbon and 13.3% hydrogen, from which it may be calculated that the polymer corresponds to one containing 1.8 mole percent of vinyl ester. The polymer has a tensile strength of 2020 lbs./sq. in. and an elongation of 180%.

*Example 6.*—A stainless steel lined pressure-resistant vessel is charged with 100 parts of water, 20 parts of vinyl benzoate, and 0.2 part of benzoyl peroxide. The pH of this mixture is 5.2. The vessel is then closed, evacuated, placed in a shaker machine and heating and agitation are started. During a reaction time of 16.5 hours throughout which the temperature is maintained at 75° to 76° C. and the pressure at 860 to 950 atmospheres there is a total observed drop of 340 atmospheres. The vessel is then cooled, bled of excess ethylene, opened, and the contents discharged. The pH of the reaction mixture is 4.7. The reaction mixture is then steam distilled to separate unreacted monomers, filtered, washed, and dried. There is thus obtained 13.5 parts of an ethylene/vinyl benzoate polymer which has an intrinsic viscosity of 0.59 (as determined on a 0.125% solution in xylene at 80° C.) and which contains 79.4% carbon. From this analysis it may be calculated that the ethylene/vinyl benzoate mole ratio is 5.45/1. The excellent properties of this polymer are reflected in its tensile strength of 1650 lbs./sq. in. at break, and its elongation is 230%.

*Example 7.*—A stainless steel lined pressure resistant vessel charged with 60 parts of water, 40 parts of vinyl diethylacetate, and 0.2 part of benzoyl peroxide. The pH of this mixture is 3.2. The vessel is closed, evacuated, and placed in a shaker machine. Reaction and agitation are started and during a reaction time of 16 hours, throughout which the temperature is maintained at 73° to 76° C. and the pressure at 850 to 955 atmospheres, there is a total observed pressure drop of 675 atmospheres. The vessel is cooled, bled of excess ethylene, opened, and the contents discharged. The reaction mixture has a pH of 3.4. From the reaction mixture there is obtained 45 parts of an ethylene/vinyl diethylacetate polymer having an intrinsic viscosity of 0.7 (as measured on a 0.125% solution in xylene at 80° C.). Analysis shows the product to contain 80.8% carbon, from which it may be calculated that the ethylene/vinyl diethylacetate mole ratio is 13.81. This polymer has a tensile strength of 1620 lbs./sq. in. at break, and an elongation of 660%. The polymer can be cold drawn to 540% of its length and has an extrusion rate of 0.5 gram per minute through a $\frac{1}{16}$ inch orifice at 25 lbs./sq. in. pressure at 150° C.

In the practice of this invention it is desirable to use equipment fabricated of or lined with material which will not catalyze the rapid decomposition of peroxide compounds to molecular oxygen. Examples of such materials are stainless steels, silver, aluminum, tin, lead, enamel, and glass.

In place of the specific vinyl esters of the examples there can be used other vinyl esters of such acids as hexahydrobenzoic, cyclohexylacetic, alpha, alpha-diethylbutyric, alpha-methyl, alpha-ethylbutyric, ortho-, meta-, and para-toluic, 2,6-dimethyl benzoic, 2,4,6-trimethyl benzoic, etc.

The vinyl esters of this invention are the vinyl esters of carboxylic acids in which the carbon atom of the carboxyl group is joined either directly or through an intervening methylene group to a carbon at least two of whose remaining valences are satisfied by carbon atoms. These carbon atoms can be part of a monovalent hydrocarbon radical or form part of a carbocyclic structure.

The term "polymer" is used herein to refer to the products obtained by polymerizing ethylene with one or more of the above described vinyl esters. Expressions such as "ethylene/vinyl ester" are used herein to designate the components only of these polymers.

For rapid and uniform polymerization it is generally desirable to agitate the reaction mixture. By the term "agitation" as used herein it is intended to include any means for accomplishing intimate contact between the reactants, for example, by rapid stirring, turbulent flow in a continuous flow process, atomization, shaking or efficient bubbling of gas through the liquid phase of the reaction system.

The pH of the reaction medium has an effect on the rate of polymerization and induction period. The most suitable pH range is dependent on the catalyst employed and to some extent on the nature of the vinyl ester being polymerized with ethylene. When using benzoyl peroxide as catalyst, or diacyl peroxides generally, it is preferred to operate at a pH below 6 and preferably in the range of about 1 to 4.

In carrying out the present invention the pH may be adjusted and/or maintained by the use of buffer salts such as potassium dihydrogen phosphate, sodium acetate, sodium carbonate, sodium tetraborate, and the like. Adjustment of the pH with dilute mineral acids or with dilute caustic solutions is also permissible.

The ratio of vinyl ester/ethylene in the polymer will depend on the relative concentration of these two materials in the reaction system as well as on their relative rates of polymerization. As previously pointed out the higher the pressure employed the higher the ratio of ethylene to vinyl esters in the polymer.

The polymers of this invention may vary widely in composition, and may contain, as an illustration, from 1% ethylene and 99% vinyl ester to 99% ethylene and 1% vinyl ester (molal basis).

The polymers of this invention are characterized by their high resistance to hydrolysis. They have excellent tensile strength, high tear resistance, good cold drawing aptitude, and can be extruded or spun into films and fibers. The films have good tumbling durability and water vapor impermeability, particularly those which are high in ethylene content.

We claim:

1. A polymer of ethylene and a vinyl ester of a carboxylic acid, said carboxylic acid having from 5 to 10 carbon atoms per molecule, and being a member of the class consisting of (1) acids in which the carbon atom of the carboxyl group is attached directly to a carbon atom of a monovalent hydrocarbon radical, said carbon atom having at least two of its remaining valences satisfied by carbon atoms, and (2) acids in which the carbon atom of the carboxyl group is attached through a methylene group to a carbon atom of a monovalent hydrocarbon radical, said carbon atom having at least two of its remaining valences satisfied by carbon atoms, said polymer containing from 1 mole per cent ethylene and 99 mole per cent of the said vinyl ester to 99 mole per cent ethylene and 1 mole per cent of the said vinyl ester.

2. A polymer in which the constituent monomers consist of ethylene and a vinyl ester of a carboxylic acid, said carboxylic acid having from 5 to 10 atoms per molecule, and being a member of the class consisting of (1) acids in which the carbon atom of the carboxyl group is attached directly to a carbon atom of a monovalent hydrocarbon radical, said carbon atom having at least two of its remaining valences satisfied by carbon atoms, and (2) acids in which the carbon atom of the carboxyl group is attached through a methylene group to a carbon atom of a monovalent hydrocarbon radical, said carbon atom having at least two of its remaining valences satisfied by carbon atoms.

3. An ethylene/vinyl trimethyl acetate polymer.
4. An ethylene/vinyl diethyl acetate polymer.
5. An ethylene/vinyl benzoate polymer.
6. A polymer in which the constituent monomers consist of at least one mole per cent of ethylene and at least one mole per cent of vinyl trimethyl acetate.
7. A polymer in which the constituent monomers consist of at least one mole per cent of ethylene and at least one mole per cent of vinyl diethyl acetate.
8. A polymer in which the constituent monomers consist of at least one per cent of ethylene and at least about one per cent of vinyl benzoate.
9. A polymer in which the constituent monomers consist of ethylene and vinyl trimethyl acetate in mole ratio of 29:1, said polymer being further characterized in that upon being pressed it forms clear tough films having good cold-drawing properties.

WILLIAM E. HANFORD.
JOHN R. ROLAND.
WALTER E. MOCHEL.

REFERENCES CITED

The following references are of record in the file of this patent:

UNITED STATES PATENTS

| Number | Name | Date |
|---|---|---|
| 2,200,429 | Perrin | May 14, 1940 |
| 2,310,780 | Hanford | Feb. 9, 1943 |
| 2,334,195 | Hopff | Nov. 16, 1943 |
| 2,342,400 | Hopff | Feb. 22, 1944 |
| 2,381,338 | Cornthwaite | Aug. 7, 1945 |
| 2,396,209 | Sharkey | Mar. 5, 1946 |